(12) United States Patent
Gilbertson et al.

(10) Patent No.: US 6,178,466 B1
(45) Date of Patent: Jan. 23, 2001

(54) SYSTEM FOR MAXIMIZING BANDPASS ON AN INTERFACE DIRECTLY COUPLING TWO UNITS WHERE THE INTERFACE HAS INDEPENDENTLY OPERATIVE DATA AND ADDRESS INTERCONNECTIONS, AND COMPUTER SYSEM EMPLOYING SAME.

(75) Inventors: Roger Lee Gilbertson, Minneapolis; Mitchell Anthony Bauman, Circle Pines, both of MN (US)

(73) Assignee: Unisys Corporation, Blue Bell, PA (US)

( * ) Notice: Under 35 U.S.C. 154(b), the term of this patent shall be extended for 0 days.

(21) Appl. No.: 09/096,822

(22) Filed: Jun. 12, 1998

(51) Int. Cl.[7] ....................................................... G06F 13/14
(52) U.S. Cl. .............................. 710/3; 710/107; 710/126; 709/207
(58) Field of Search ............................... 710/3, 107, 126; 709/207

(56) References Cited

U.S. PATENT DOCUMENTS

| | | | |
|---|---|---|---|
| 5,230,048 | * | 7/1993 | Moy ........................................... 707/1 |
| 5,235,685 | | 8/1993 | Caldara et al. ....................... 395/325 |
| 5,237,567 | | 8/1993 | Nay et al. ............................. 370/85.1 |
| 5,537,138 | * | 7/1996 | Yamada et al. ....................... 347/171 |
| 5,666,551 | | 9/1997 | Fenwick et al. ................. 395/200.37 |
| 5,708,783 | * | 1/1998 | Yazdy .................................... 710/113 |
| 5,737,546 | | 4/1998 | Fenwick et al. ....................... 395/290 |
| 5,809,258 | * | 9/1998 | Bemanian et al. .................... 710/107 |
| 5,812,815 | * | 9/1998 | Yazdy .................................... 711/140 |
| 5,941,973 | * | 8/1999 | Kondo et al. .......................... 710/129 |

FOREIGN PATENT DOCUMENTS

07002827 * 1/1995 (JP) .

* cited by examiner

Primary Examiner—Thomas C. Lee
Assistant Examiner—Abdelmoniem Elamin
(74) Attorney, Agent, or Firm—Beth L. McMahon; Michael B. Atlass; Charles A. Johnson

(57) ABSTRACT

A control system and interface is provided for controlling the transmission of address and data signals via independently operative bi-directional address and data interfaces, respectively, within a data processing system. The system allows address signals to be transferred via the address interface either before, or after, associated data signals are transferred. The address interface operates at a rate which is independent of the rate achieved on the data interface. Address signals transferred on the address interface are stored in one of a plurality of address storage devices depending on request type. A routing circuit associates later-provided data signals with the address storage device storing the associated address signals, and a correlation circuit allows the address storage device to record the data transfer with the associated address signals. According to one embodiment, the correlation is performed using a pointer indicative of a storage location temporarily storing the data signals. If the data signals are transferred prior to the associated address signals, the data signals are temporarily stored until the associated address signals are transferred, sorted, and associated with a selected one of the address storage devices. Following correlation of address and data signals, the associated request is eligible for processing based on the availability of the requested resource.

30 Claims, 7 Drawing Sheets

DATA VALID ROUTING LOGIC

SYSTEM FOR MAXIMIZING BANDPASS ON AN INTERFACE DIRECTLY COUPLING TWO UNITS WHERE THE INTERFACE HAS INDEPENDENTLY OPERATIVE DATA AND ADDRESS INTERCONNECTIONS, AND COMPUTER SYSEM EMPLOYING SAME.

CROSS-REFERENCE TO OTHER APPLICATIONS

The following co-pending applications of common assignee contain some common disclosure:

"Bi-Directional Interface Distributed Control Mechanism", filed Jun. 12, 1998, Ser. No. 09/096,624 still pending, incorporated herein by reference in its entirety;

"High-Performance Modular Memory System with Crossbar Connection", filed Dec. 31, 1997, Ser. No. 09/001,592 still pending; and "Directory-Based Cache Coherency System Supporting Multiple Instruction Processor and Input/Output Caches", filed Dec. 31, 1997, Ser. No. 09/001,598 still pending.

BACKGROUND OF THE INVENTION

1. Field of the Invention

This invention relates generally to an interface and interface control system for transferring signals between various units in a data processing system; and, more specifically, relates to an improved interface and interface control system for transferring address and data signals via independently and asynchronously operative address and data interfaces, respectively.

2. Discussion of the Prior Art

Data processing systems generally include multiple units such as processing units, memory units, input/output units, and the like, which are interconnected over one or more system interfaces. The interfaces provide for the transfer of digital signals between the units. Since many of the operations within data processing systems involve such transfers, the efficiency of the interfaces has a major impact on the overall performance of the data processing system.

Many conventional interfaces used within data processing systems have several types of signal lines, including data lines for transferring data signals, and address lines for transferring address signals. The address lines generally provide information indicative of the type of request, and further indicate a unit and/or a particular addressable resource associated within the unit that is involved with the request. The data lines provide data signals which are associated with the request.

In many data processing systems, the address and data lines operate in a lock step fashion. That is, for a given request utilizing a system interface, the address signals and data signals are transferred over the interface during operations which have a predetermined relationship to one another. The requesting unit will retain control of both the address and data lines during the entire transfer, even if the address lines, data lines, or both, are idle during a portion of that transfer. For example, often, the address lines are needed only during the time required for the addressed unit to receive and decode the request. If data signals are associated with the request, the address lines will remain idle during the time required to perform the data transfer. Because the requesting unit retains control over the unused address lines, no other unit in the system may use the address interface to initiate a request, thereby diminishing overall performance. Similarly, some requests may only involve the address lines. Forcing the data lines to remain idle during this time also limits system throughput.

To increase system throughput, some systems provide data and address interfaces which do not operate in lock step fashion. In these types of systems, a unit may relinquish control of the address lines while still maintaining control of the data lines. This allows a different unit to initiate a request over the address lines while a first request completes over the data lines so that a higher throughput rate is achieved. Although allowing data and address transfers to occur in other than a lock step manner increases system throughput, some method is needed to correlate data and address signals associated with the same request. One method is to utilize identification information to associate data signals with later transferred address signals or vice versa. A system using this approach is disclosed in U.S. Pat. No. 5,237,567 to Nay et al. This system includes an identification bus having lines dedicated to transferring information identifying the requester, receiver, and the source of the data. This information is included with both address and data transfer operations so that separate data and address transfers may be correlated as being associated with the same request. The Nay system further attempts to simplify the correlation process by requiring that during any write operation, a requester must provide the data signals in the same bus cycle as the address signals. Thus, in Nay, data and address interface independence is only truly achieved for read operations, but not for write operations, limiting interface flexibility. Additionally, the Nay system requires additional interface lines to perform the correlation between data and address components of a request. In units having a limited number of interface resources such as pins, this solution is undesirable.

A system using an approach similar to that described by Nay is disclosed by U.S. Pat. No. 5,235,685 to Caldara et al. Caldara describes an I/O interface having independent command and data lines. The command lines are used to initiate an I/O transfer to or from ones of the I/O units connected to a master, and data lines are used to provide associated data signals during a later independent data transfer operation. The command and data transfers are correlated using a dedicated ten-line control interface. This system, like the Nay system, has the disadvantage of requiring an additional dedicated interface to associate data signals with earlier-provided command signals. Moreover, the Caldara system requires that for any given transfer operation, the command signals must be transferred prior to the associated data signals. This reduces interface flexibility.

Another system for correlating operations occurring on quasi-independent data and address interfaces is disclosed in U.S. Pat. No. 5,666,551 to Fenwick et al. In the Fenwick system, each unit interfacing to the data bus includes a data sequencer which keeps a running count of the number of outstanding transfers on the address bus which are awaiting an associated data transfer. The sequencer also records which of those outstanding transfers will involve the unit with which that sequencer is associated. The priority logic orders transfers on the data bus by selecting the unit associated with the next sequence number. The Fenwick method has the disadvantage of requiring all units to respond in sequence order. For example, two outstanding read operations must be completed in the order the addresses were provided to the memory units, even if the later-initiated operation involves a faster memory device capable of providing data prior to the first memory device. This sequenced approach therefore does not result in optimal throughput. Moreover, since every unit transferring data must include a logic sequencer, the solution is relatively logic intensive.

What is needed is a system for allowing data and address transfers to occur in a truly independent fashion without requiring additional interface lines to correlate data and address transfers. To provide for optimal throughput, the independent data and address lines should be capable of providing data signals prior to associated address signals and vice versa. Moreover, the order of processing requests should not be predicated on the order in which address signals are transferred.

Objects

The primary object of the invention is to provide an improved control system for a data processing system having independent address and data interfaces;

A further object of the invention is to provide independent address and data interfaces for a data processing system wherein a predetermined maximum number of address requests may be transferred via the address interface before any associated data signals are transferred via the data interface;

A yet further object of the invention is to provide independent address and data interfaces for a data processing system whereby data signals may be provided via the data interface prior to associated address signals being provided via the address interface;

A still further object of the invention is to provide independent address and data interfaces for a data processing system whereby address and data signals transferred during independent transfers are correlated without the use of dedicated interface signals;

Another object of the invention is to provide independent address and data interfaces for initiating requests and transferring respective data signals, respectively, and whereby the initiated requests need not be processed in the order in which they are initiated;

A further object of the invention is to provide a control system for controlling independent address and data interfaces, the control system for sorting requests received via the address interface into multiple types, and for matching selected ones of the sorted requests to later-received associated data signals provided on the data interface;

A yet further object of the invention is to provide independent bi-directional address and data interfaces for use in a data processing system whereby at any given time, both interfaces need not be controlled by the same unit; and A still further object of the invention is to provide independent bi-directional address and data interfaces capable of transferring address and data signals, respectively, at independent transfer rates.

These and other more detailed and specific objectives of the invention will become apparent from the following description of the invention.

SUMMARY OF THE INVENTION

The objectives of the present invention are achieved in an intercoupling mechanism for a data processing system having independent bi-directional address and data interfaces. The address and data interfaces are for transferring address signals and associated data signals, respectively, during independent and asynchronous transfer operations. According to one embodiment of the invention, the address and data interfaces are provided between first and second units of the system. At any instant in time, either the first or second unit may be transferring address signals via the address interface to the other unit. Predetermined ones of the transfers performed via the address interface are associated with data signals. These associated data signals may be transferred via the data interface either before, or after, the associated address transfer operation is performed, depending on data interface availability. Similarly, at any instant in time, either the first or second unit may be transferring data signals to the other unit. Therefore, transfer operations occurring simultaneously on the data and address interfaces are not necessarily related or controlled by the same unit, are not performed in lock step, and are not occurring at related transfer rates, but are performed in the manner which will result in optimum system throughput.

A novel control system is used to correlate address and data transfer operations belonging to the same request. Address transfer operations performed by a requesting unit are sorted, and the associated signals are stored in a selected one of a plurality of address storage devices based on request type. Up to a predetermined maximum number of address transfer operations may be pending at any given time. Predetermined ones of these pending address transfer operations are associated with data signals. Since data transfer operations are performed independently and asynchronously of the address transfer operations, a pending address transfer operation may have to wait until an associated data transfer operation is performed to be eligible for processing.

A routing device records the time-order and request-type of any pending address transfer operation that is associated with a yet unperformed data transfer operation. When the data transfer is eventually performed, the routing device associates the data signals with the one of the address storage devices which stores the associated address signals. Then a correlation circuit coupled to each of the address storage devices associates the data signals with the associated address signals. According to one embodiment of the invention, this correlation involves storing a data pointer in the selected one of the address storage devices, wherein the data pointer points to the data signals which are temporarily stored within a data storage device.

When the correlation is completed, the associated request is eligible for processing by the requested unit. Requests need not be processed in the order in which data or address transfers occurred, but may be processed based on the availability of the requested resource, wherein a plurality of resources are available within each of the units. Scheduling requests based on resource availability improves overall system throughput.

For those data transfer operations performed by the requested unit and initiated by an earlier address transfer operation performed by the requesting unit, identity information provided on selected general-purpose lines of the interface are used to associated the data transfer with the earlier-performed address transfer. Thus, all correlation between address and data transfer operations is performed without the need of any special-purpose interface signals.

As discussed above, data transfer operations may precede an associated address transfer operation. In this situation, the data signals are temporarily stored until the associated address signals are transferred, sorted, and associated with a selected one of the address storage devices. At that time, the data signals are also correlated with the selected one of the address storage devices. By allowing the data signals to precede the address signals for a given request, maximum usage of the data and address interfaces may be achieved.

Still other objects and advantages of the present invention will become readily apparent to those skilled in the art from the following detailed description of the preferred embodiment and the drawings, wherein only the preferred embodiment of the invention is shown, simply by way of illustration of the best mode contemplated for carrying out the invention. As will be realized, the invention is capable of other and different embodiments, and its several details are capable of modifications in various respects, all without departing from the invention. Accordingly, the drawings and description are to be regarded to the extent of applicable law as illustrative in nature and not as restrictive.

BRIEF DESCRIPTION OF THE FIGURES

The present invention will be described with reference to the accompanying drawings.

DETAILED DESCRIPTION OF THE PREFERRED EMBODIMENTS

System Platform

Figure 1:
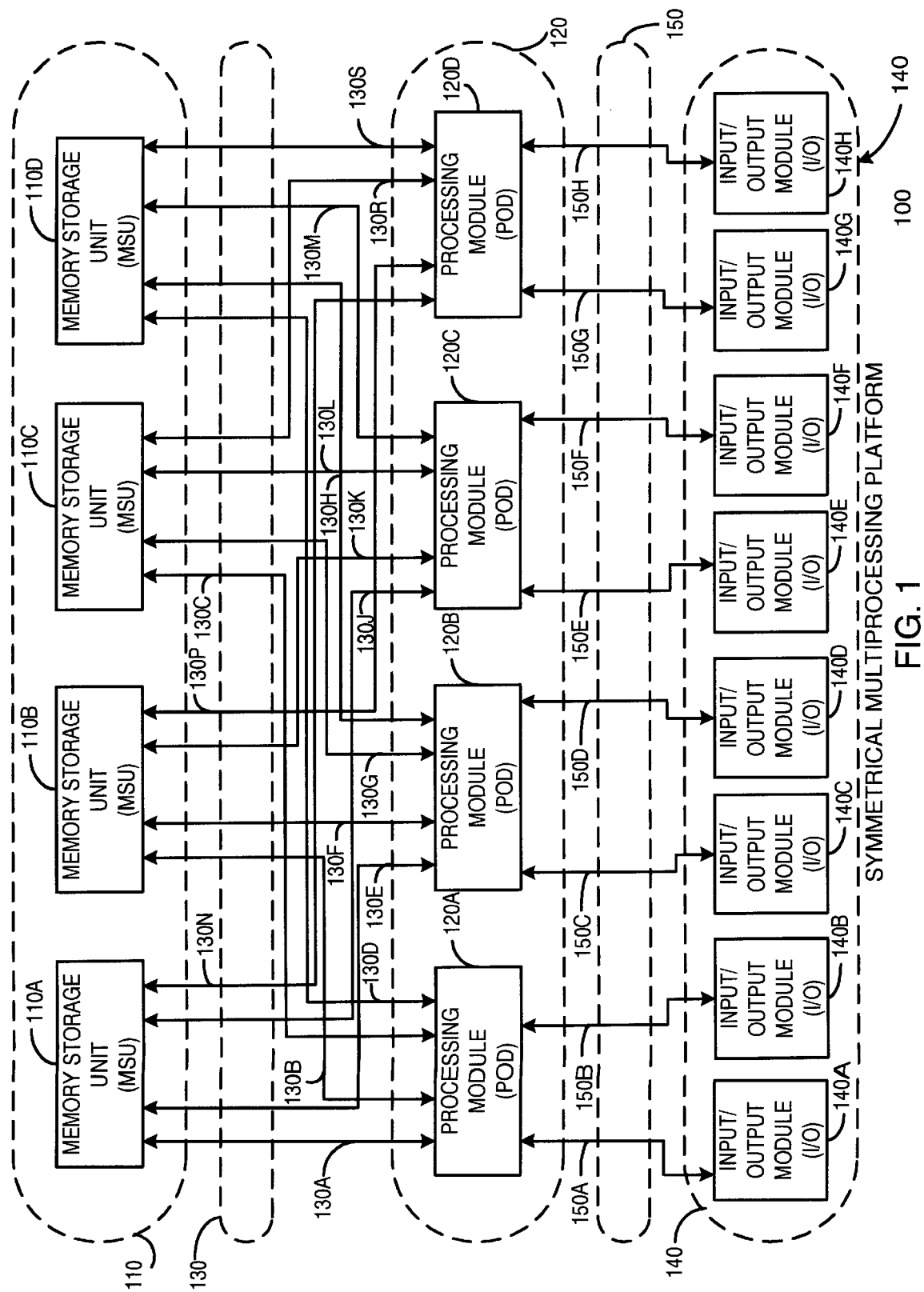
FIG. 1 is a block diagram of a Symmetrical MultiProcessor (SMP) system platform a cording to a preferred embodiment of the present invention.

FIG. 1 is a block diagram of a Symmetrical Multi-Processor (SMP) System Platform which includes the preferred embodiment of the present invention. System Platform 100 includes one or more Memory Storage Units (MSUs) in dashed block 110 individually shown as MSU 110A, MSU 110B, MSU 110C and MSU 110D, and one or more Processing Modules (PODs) in dashed block 120 individually shown as POD 120A, POD 120B, POD 120C, and POD 120D. Each of the PODs 120 includes one or more data processing units. Each unit in MSU 110 is interfaced to all PODs 120A, 120B, 120C, and 120D via dedicated, point-to-point connections referred to as MSU Interfaces (MIs) shown in dashed block 130, and individually shown as 130A through 130S. For example, MI 130A interfaces POD 120A to MSU 110A, MI 130B interfaces POD 120A to MSU 110B, MI 130C interfaces POD 120A to MSU 110C, MI 130D interfaces POD 120A to MSU 110D, and so on. Each MI provides the respective POD 120 direct access to data stored in the respective MSU 110.

In the preferred embodiment of the Platform 100, MI 130 comprises separate bi-directional data and bi-directional address/function interconnections, and further includes uni-directional control lines that control the operation on the data and command interconnections (not individually shown in FIG. 1). The address/function interconnections run at system clock frequency (SYSCLK) while the data bus runs source synchronous at two times the system clock frequency (2x SYSCLK). In a preferred embodiment of the present invention, the system clock frequency is 100 megahertz (MHZ).

System Platform 100 further comprises Input/Output (I/O) Modules in dashed block 140 individually shown as I/O Modules 140A through 140H, which provide the interface between various Input/Output devices and one of the PODs 120. Each I/O Module 140 is connected to one of the PODs across a dedicated point-to-point connection called the MIO Interface in dashed block 150 individually shown as 150A through 150H. For example, I/O Module 140A is connected to POD 120A via a dedicated point-to-point MIO Interface 150A. The MIO Interfaces 150 are similar to the MI Interfaces 130, but in the preferred embodiment have a transfer rate that is approximately half the transfer rate of the MI Interfaces because the I/O Modules 140 are located at a greater distance from the PODs 120 than are the MSUs 110.

Figure 2:
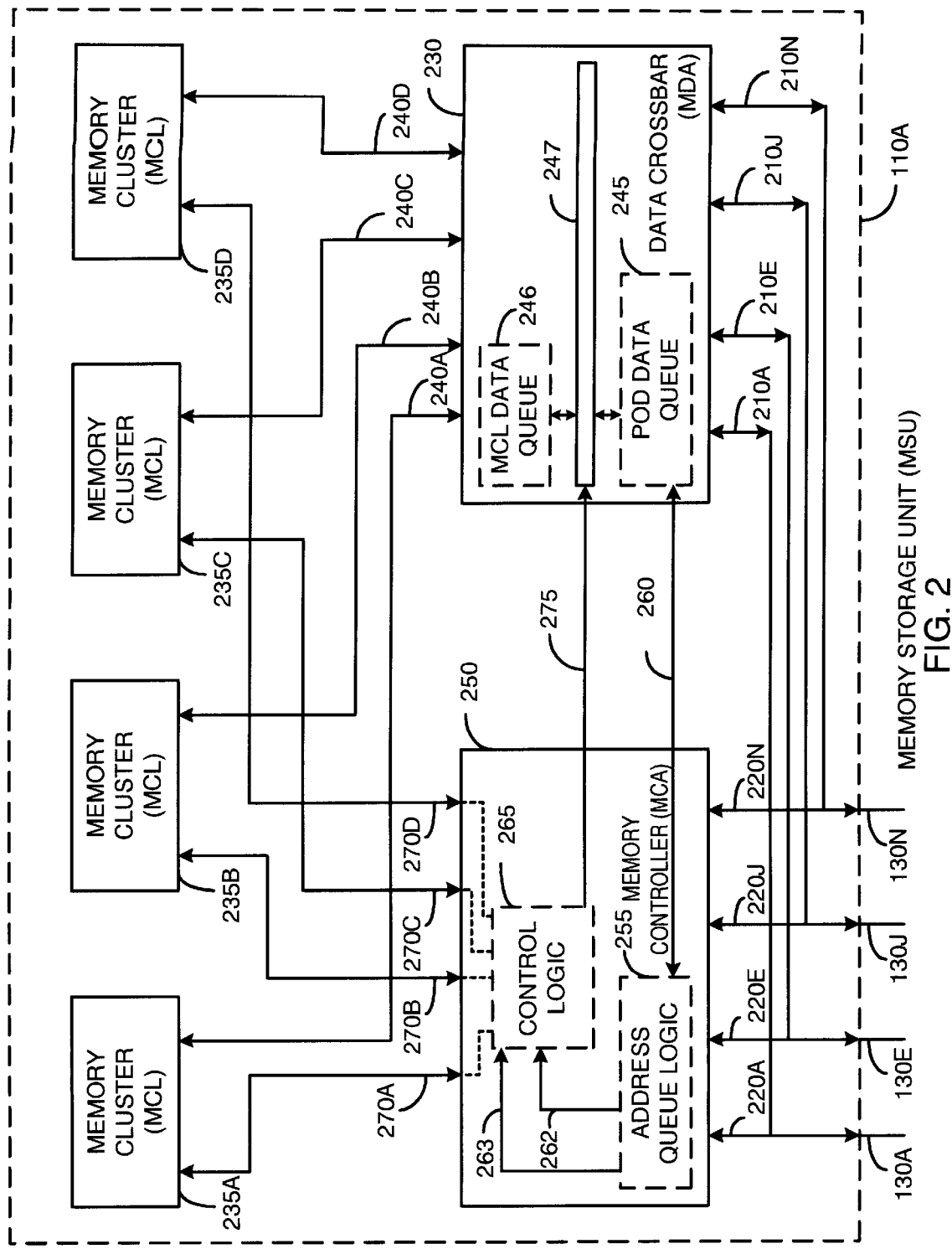
FIG. 2 is a block diagram of a Memory Storage Unit (MSU)

FIG. 2 is a block diagram of a Memory Storage Unit (MSU) 110. Although MSU 110A is shown and discussed, it is understood that this discussion applies equally to each of the MSUs 110. As discussed above, MSU 11 OA interfaces to each of the PODs 120A, 120B, 120C, and 120D across dedicated point-to-point MI Interfaces 130A, 130E, 130J, and 130N, respectively. Each MI Interface 130 actually includes two separate, independently-operative interfaces. The first interface is shown as Data Interface 210 (illustrated as 210A, 210E, 210J, and 210N). Each set of Data Interfaces 210 includes bi-directional data bits, parity signals, and uni-directional control signals (not individually shown in FIG. 2). In addition to the Data Interfaces 210, each MI Interface 130 includes bi-directional Address/function Interfaces 220 (shown as 220A, 220E, 220J, and 220N), each of which includes address/function signals, unidirectional control signals, and a unidirectional address request (not individually shown in FIG. 2). Data Interfaces and Address/function Interfaces operate in split transaction mode. That is, for a given request, the data signals provided on Data Interfaces 210, and the Command information provided on Address/function Interfaces 220 may be transferred at different times during completely disassociated transfer operations, as is discussed further below.

Data Interface 210A, 210E, 210J, and 210N interface to the Memory Data Crossbar (MDA) 230. The MDA 230 buffers data signals received on Data Interfaces 210 from the PODs 120, and provides the switching mechanism that may route these buffered data signals to an addressed one of the storage units called Memory Clusters (MCLs) 235 (shown as 235A, 235B, 235C, and 235D) via Bi-directional Interfaces 240 (shown as 240A, 240B, 240C, and 240D). Data signals are also returned from MCLs 235 to a requesting POD 120 via Bi-directional Interfaces 240 and MDA 230. The control logic associated with this routing operation is beyond the scope of this patent.

In addition to routing data signals between various ones of the PODs 120 and ones of the MCLs 235, the MDA 230 also routes buffered ones of the data signals received from PODs to any ones of the PODs during POD-to-POD transfer operations to be discussed further below. For example, data signals received from POD 120A and buffered by MDA 230 may be routed to Data Interface 210A, 210E, 210J, or 210N for reception by POD 120A, 120B, 120C, or 120D, respectively. POD-to-POD routing control is discussed in detail in the co-pending Application entitled "High-Performance Modular Memory System with Crossbar Connections", Ser. No. 09/001,592, filed Dec. 31, 1997 still pending, and which is incorporated herein by reference in its entirety.

The MDA buffers the data signals provided by PODs 120 via Data Interfaces 210 in POD data queue structures. A different queue structure is provided for each of the Data Interface 210A, 210E, 210J, and 210N. In FIG. 2, the POD data queue structure associated with Data Interface 210A is shown as POD Data Queue 245. Similar queue structures (not shown) exist for the other Data Interfaces 210E, 210J, and 210N. POD Data Queue 245 can be any addressable storage device capable of storing a predetermined maximum number of data signals.

The MDA also buffers the data signals provided by MCLs 235 via Data Lines 240 in MCL data queue structures. A different queue structure is provided for each of the Data Lines 240A, 240B, 240C, and 240D. In FIG. 2, the MCL data queue structure associated with Data Lines 240A is shown as MCL Data Queue 246. Similar queue structures (not shown) exist for the other Data Lines 240B, 240C, and 240D. MCL Data Queue 246 can be any addressable storage device capable of storing a predetermined maximum number of data signals.

Whereas the MDA 230 buffers data signals provided via Data Interfaces 210 and Data lines 240, the Memory Controller (MCA) 250 buffers the address and control signals associated with POD-to-MSU requests that are provided via Address/function Interfaces 220. The MCA includes an input queue structure for each of the Address/function Interfaces 220. The input queue structure for Address/function Interface 220A is shown in FIG. 2 as Address Queue 255. Similar address queue structures (not shown) are provided for each of the other Address/function Interfaces 220E, 220J, and 220N.

As mentioned above, for those requests during which the POD provides data to the MSU, which includes message operations and most memory store operations, the command and associated data are not necessarily transferred by the POD to the MSU at the same time. This is because the Data Interfaces 210 and the associated Address/function Interfaces 220 do not operate in lock step. Therefore, for predetermined request types, address and control signals may precede the associated data signals or vice versa. Thus data signals may be stored within POD Data Queue 245 until the associated address is received on Address/function Interfaces 220. Alternatively, address signals may be stored temporarily in Address Queue 255 until the associated data signals are received on Data Interfaces 210. The indication that data is being transmitted by the POD is provided by a unidirectional control signal in each set of Data Interfaces 210. This signal is used to correlate address signals stored within Address Queue 255 to associated data signals stored within POD Data Queue 245 in a manner to be discussed in detail below.

Once both address signals and associated data signals for a given POD request are resident within the respective queue structures, the address signals are provided on Lines 262 or 262 to Control Logic 265 for further processing in a manner to be discussed below. Control Logic 265 provides arbitration and control to gate the address and appropriate read/write control to the appropriate one of the MCLs 235 across address Lines 270 (shown as 270A, 270B, 270C, and 270D) if the request involves a memory operation. Control Logic 265 further provides Control Signals 275 to Data Queue Interconnect Logic 247. Control Signals 275 provide all the data routing control to logically connect a data source queue to a data destination queue. Control Signals 275 control interconnection of source and destination data queues, and also initiate sequences to move the data. Data can be transferred from POD Data Queue 245 to MCL Data Queue 246 for memory stores, MCL Data Queue 246 to POD Data Queue 245 for memory fetches, or POD Data Queue 245 to another one of the POD Data Queues (not shown) for POD-to-POD message transfer operations, or other POD-to-POD operations.

POD/MSU Interface

Figure 3:
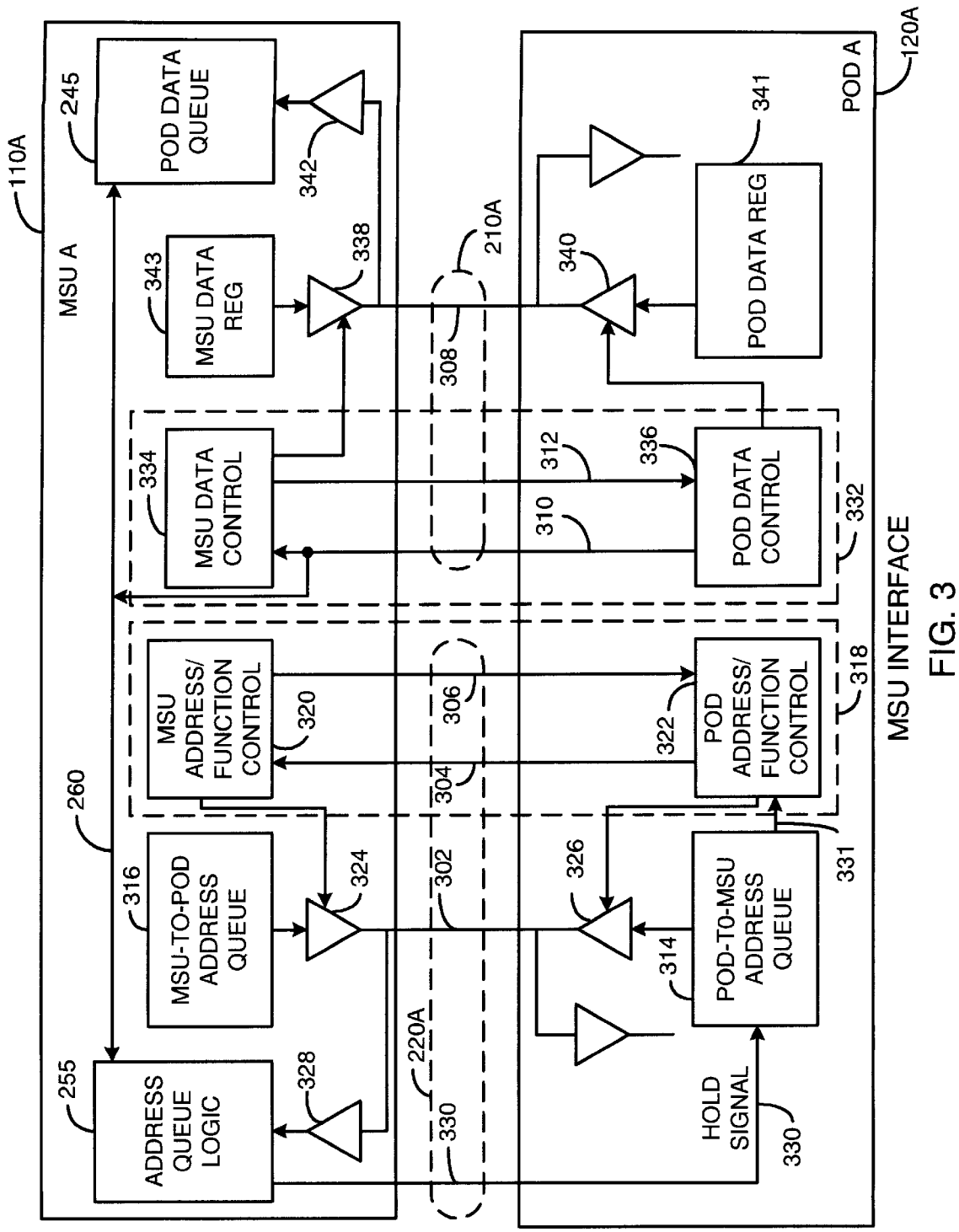
FIG. 3 is a block diagram of bi-directional MSU Interface (MI) and associated interface control logic.

FIG. 3 is a block diagram of bi-directional MSU Interface (MI) 130A and associated interface control logic. It is understood that a similar structure is associated with each of the MI Interfaces 130. As discussed above, MI 130A includes Address/function Interface 220A and Data Interface 210A (shown dashed). These bi-directional interfaces transfer address and data information, respectively, between POD 120A and MSU 110A. These interfaces do not operate in lock step. That is, at any instant in time, the transfer operation being performed on the Address/function Interface 220A may be associated with a different request than is being serviced on Data Interface 210A.

The Address/function Interface 220A of the preferred embodiment include bi-directional Address/Function (A/F) Lines 302 which in the preferred embodiment contain 21 signals for transferring address and control information, and also include associated parity signals. Address/function Interface 220A also include an associated POD Request Signal 304, (also called "P_REQ"). When a request is initiated from the POD-to-MSU, the POD Request Signal 304 is asserted, and the A/F Lines 302 are driven by the POD during a two-cycle transfer operation which is capable of conveying up to 42 bits of address and control information regarding the request. The control information provided by the A/F Lines includes information indicating the type of request being made. In the preferred embodiment, the types of requests which may be indicated by the A/F Signals include POD requests to store/fetch data to/from memory, I/O requests to gain memory access, and requests to send message data signals from one POD to another POD. A/F Lines also convey address information which varies depending on the type of request being submitted. During requests to store/fetch data to/from memory, the A/F Lines 302 provide a MSU address associated with the requested data transfer. For a POD-to-POD message request, the A/F Signals identify the destination POD 120 which is to receive associated message data, and also identify other specific information about the type of message.

The bi-directional A/F Lines 302 may also be driven by the MSU after the MSU gains control of the interface by asserting the MSU Request Signal 306. MSU 110A drives the A/F Lines 302 to provide a function code and associated address signals to POD 120A which cause the POD to perform a specified operation. These operations are associated with maintaining coherency between the MSUs 110 and various cache memories in Platform 100. For example, a Return function code is issued by MSU 110A to POD 120A after another one of the PODs 120 or I/O Modules 140 requests access to data which may have been updated within one of the caches located in POD 120A. When POD 120A receives the Return function code, the POD responds by returning the addressed data to the MSU so that the other POD or I/O Module may have access to that data. This return of data is a type of store command and will cause a memory store. The return may also cause a POD-to-POD data transfer if this type of operation is enabled in the MSU. Similarly, a Purge function code is issued by MSU 110A to POD 120A when data stored within one of the cache memories within POD 120A becomes unusable for various coherency reasons. The various coherency functions supported by Platform 100 are discussed in detail in the Application entitled "Directory-Based Cache Coherency System Supporting Multiple Instruction Processor and Input/Output Caches", Ser. No. 09/001,598, filed Dec. 31, 1997, which is incorporated herein by reference in its entirety.

MI Interface 130A also includes Data Interface 210A. Data Interface 210A of the preferred embodiment include Data Signal Lines 308 which contain 64 bi-directional data lines and associated parity and parity error signals (not individually shown.) Data Interface 210A also includes Data Request Signal 310 (or "P_ARB"), which is asserted by the POD when the POD initiates a POD-to-MSU data transfer operation. Several clock cycles later, the data is transferred from the POD to the MSU in eight successively-performed 8-byte transfer operations so that the total transfer conveys a 64-byte packet. In the preferred embodiment, each of the 8-byte transfer operations occurs at a rate of twice the system clock frequency.

Data is transferred from the POD to the MSU via Data Signal Lines 308 during message transfer operations when POD 120A is sending message data to be routed to another POD via the MSU 110A. Data is also sent to the MSU 110A during most, but not all, store operations. (For simplicity, the remainder of this Specification will discuss "store" operations as those stores that are associated with POD-supplied data signals.) Finally, data is sent by the POD to the MSU via Data Signal Lines 308 following the POD's reception of a Return function from the MSU, as discussed above. During each of these transfers, the POD gains control over Data Signal Lines 308 by asserting the Data Request Signal 310.

The MSU 110A also performs transfer operations over Data Signal Lines 308 to the POD 120A. These transfer operations occur when the MSU returns requested fetch data, provides a POD-to-POD pathway for routing returned data from one POD to another POD, or provides message data which is routed from a different POD 120. In either of these instances, the MSU arbitrates and gains control of the Data Signal Lines 308 using the Response Signals on Line 312. The Response Signals are a group of vectored signals which informs the POD of the type of operation being performed; for example, whether the data is associated with a message data transfer or a fetch data transfer. In the case of data associated with a fetch data transfer, the Response Signals also provide the correlation between the previously-issued POD-to-MSU fetch request, and the data being returned by the MSU 110A. This correlation is performed using a multi-bit code called a "job number". This number is necessary because memory requests are not necessarily processed in the order in which they are received from POD 120A. Therefore MSU 110A must inform POD 120A which request is associated with returned data.

As discussed above, Address/function Interface 220A operates independently of Data Interface 210A. That is, for a given request, there is no rigid timing relationship between the transfer of data and the transfer of the associated address and control signals. POD 120A queues address signals for transfer via Address/function Interface 220A in the POD-to-MSU Address Queue 314, and the MSU 110A queues address and function codes in the MSU-to-POD Address Queue 316. The control of request selection for the A/F Lines 302 is performed using Distributed Address/function State Machine 318, which includes MSU Address/function Control 320 and POD Address/function Control 322. Distributed Address/function State Machine 318 uses the POD Request Signal 304 and the MSU Request Signal 306 to arbitrate for use of A/F Lines 302, and to bias tri-state drivers 324 and 326 based on the outcome of the arbitration. The priority and control mechanism utilized by Distributed Address/function State Machine 318 is described in detail in the co-pending application entitled "Bi-Directional Interface Distributed Control Mechanism", Ser. No. 09/096,624, filed Jun. 12, 1998 still pending, and which is incorporated herein by reference in its entirety.

After address and control information is transferred by POD 120A on A/F Lines 302 to MSU 110A, this information is driven via tri-state Receiver 328 to Address Queue Logic 255 where it is stored until it is ready to be processed by the MSU 110A. If the request is associated with data, the request information must be stored within Address Queue Logic 255 until the associated data signals are transferred by POD 120A to the MSU. Since the address and data interfaces are not synchronized, there is no predetermined time when this must occur. Address Queue Logic 255 is capable of storing a predetermined maximum number of commands, which in the preferred embodiment is sixteen. Before this predetermined maximum number has been reached, the Address Queue Logic 255 asserts the Hold Signal 330 to POD-to-MSU Address Queue 314, which then forwards the Hold Signal on Line 331 to POD Command Control 322. The Hold Signal prevents POD Address/function Control 322 from sending more requests until the Hold Signal is de-asserted. The MSU asserts the Hold Signal early enough so that address transfers which are already in the process may be completed, and no overrun conditions occur within the Address Queue Logic 255. The Hold Signal 330 is therefore another mechanism used to throttle the rate at which address signals are sent by the POD to the MSU.

Control of Data Interface 210A is similar to the control provided for Address/function Interface 220A. Distributed Data State Machine 332, which includes MSU Data Control 334 and POD Data Control 336, controls the use of Data Signal Lines 308 through the Data Request Signal 310 and the Response Signals 312. Distributed Data State Machine 332 biases tri-state drivers 338 and 340 based on the outcome of the arbitration. The priority and control mechanism utilized by Distributed Data State Machine 332 is described in detail in the co-pending application entitled "Bi-Directional Control Distributed Interface Mechanism" referenced above.

Before transmission over Data Signal Lines 308, data signals are stored in POD Data Register 341. When the POD obtains control of the interface, these signals are driven by tri-state Driver 340 to the MSU. Within the MSU, the data signals are driven to POD Data Queue 245 via Receiver 342, where they are stored until they are selected for processing by the MSU 110A. When data signals are transferred by MSU 110A to POD 120A, the data signals are provided by MSU Data Register 343, and are passed to a buffer (not shown) within POD 120A where they await routing to the appropriate cache memory.

Since address and data signals for a POD-to-MSU store or message request are not necessarily transferred at the same time, address and data information associated with the same request must be correlated sometime after this information is transferred over the Address/function Interface 220A and Data Interface 210A, respectively. In the MSU, this correlation process is performed using the uni-directional Data Request Signal 310 in conjunction with state information contained within MSU Data Control 334, and address information queued in the Address Queue Logic 255. The MSU Data Control 334 forwards the Data Request Signal 310 to Address Queue Logic 255 and to Data Queue 245 on the interface shown as Control Lines 260A and 260, as will be described in detail below.

Figure 4:
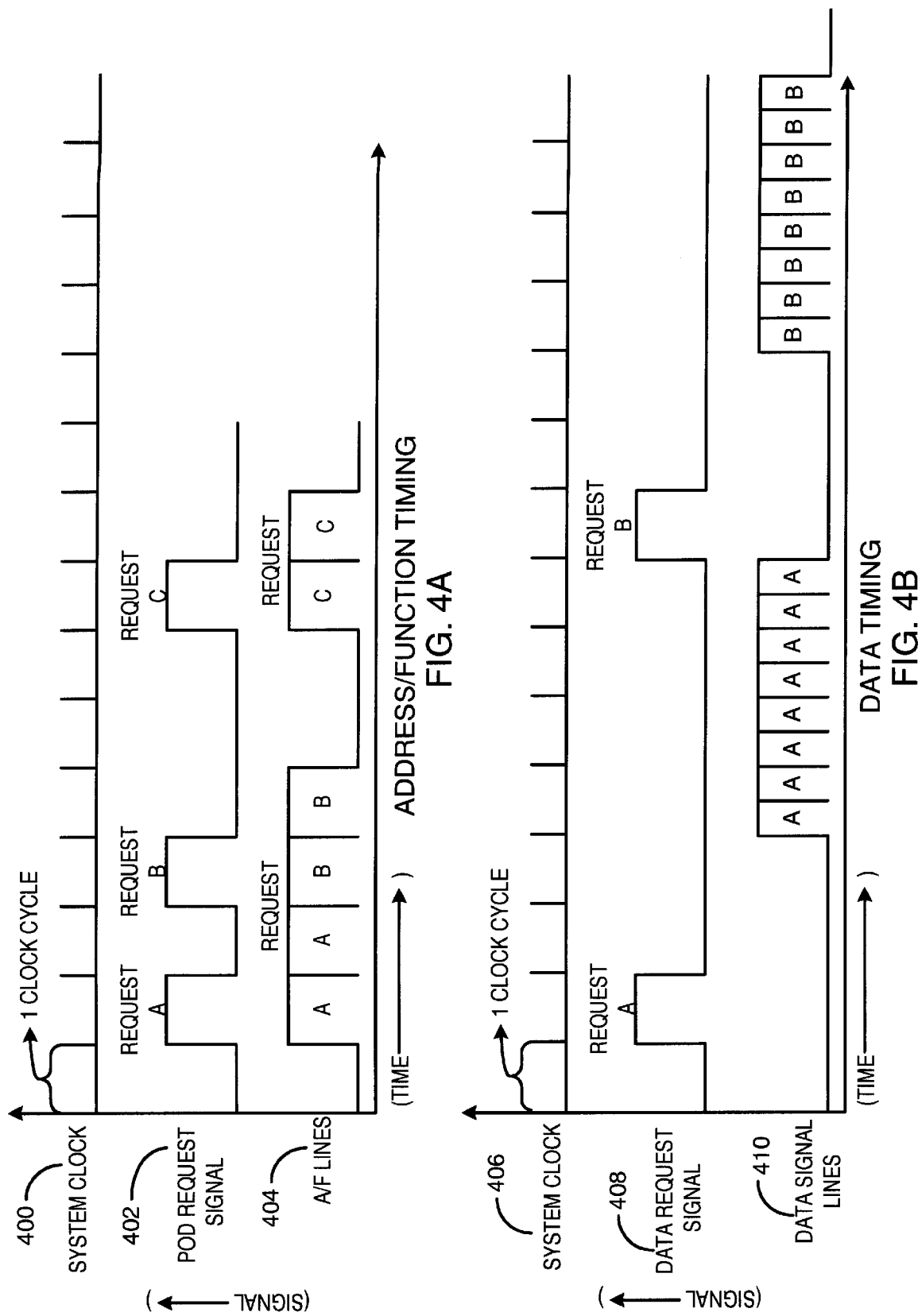
FIG. 4A is a timing diagram of a POD-to-MSU address transfer.
FIG. 4B is a timing diagram of a POD-to-MSU data transfer.

FIG. 4A is a timing diagram of a POD-to-MSU address transfer. The timing diagram is discussed in terms of MI 130A, although it is understood that this discussion applies to all MIs 130. Waveform 400 represents the system clock, which in the preferred embodiment operates at 100 MHz. As shown in waveform 402, the unidirectional POD Request Signal 304 is asserted for one clock cycle each time a POD-to-MSU command transfer is performed. This informs the MSU 110A that POD 120A is performing a transfer on the Address/Function (A/F) Lines 302. At the same time the POD asserts POD Request Signal 304, the first of two consecutive transfers is initiated on the A/F Lines 302. This transfer requires one clock cycle to complete and is immediately followed by a second transfer. In total, the two-cycle transfer conveys 42 bits of address and control information to the Address Queue Logic 255. It may be noted that two requests may be made back-to-back on the interface, as shown by the back-to-back occurrence of Requests 1 and 2 in waveform 404 of FIG. 4A. Sometime later, this waveform shows Request 3 being made. The scheduling and control over the use of A/F Lines 302 is provided by Distributed Address/Function State Machine 318 as discussed above.

FIG. 4B is a timing diagram of a POD-to-MSU data transfer. As in FIG. 4A discussed above, waveform 406 represents the system clock, which in the preferred embodiment operates at 100 MHz. Uni-directional Data Request Signal 310 is asserted for one clock cycle each time a POD-to-MSU data transfer is about to be performed to inform the MSU that the POD is arbitrating for use of the Data Signal Lines 308 as illustrated in waveform 408. When the MSU receives the asserted Data Request Signal, the MSU will complete any current transfer of data on Data Signal Lines 308, and will then will relinquish control of the interface. Distributed Data State Machine 332 within the POD indicates when the MSU transmission is completed. After the MSU has relinquished control of the interface, a minimum of one clock cycle must occur while the bus settles. As shown in FIG. 4B, the POD must wait a minimum of three clock cycles between the initial assertion of the Data Request Signal and the first transmission of data on Data Signal Lines 308 regardless of whether the MSU is using the Data Signal Lines when the request is made. When the POD begins the data transfer, eight consecutive transfer operations are performed on the 64-bit (8-byte) Data Signal Lines 308 at twice the system clock frequency, as shown in waveform 410. The transferred 64-byte packet is buffered in POD Data Queue 245, matched with the associated address using the queue mechanism discussed below, and finally selected by the MSU for processing. A second data request may be made immediately following the first request, as shown in FIG. 4B.

As discussed above, there is no rigid timing relationship imposed between the transmission of data and the transmission of the associated command signals. Allowing the Address/function Interface 220A to operate independently of the Data Interface 210A is especially important since many requests within the system of the preferred embodiment do not require the immediate transmission of data signals from the POD to the MSU. Address and control information associated with requests that do not require transmission of data signals may be transferred on the independent Address/function Interface while an unrelated data transfer is completing on the Data Interface 210A, thereby increasing system throughput. Requests not associated with POD-to-MSU data transfers include POD and I/O requests to fetch data from the MSU, some special store operations, and some commands issued by the MSU to the POD.

Although there is no rigid timing relationship imposed between address and data transfer operations for a given request, it is required that for those requests associated with data signals, the same order be maintained for the transfer operations performed on the Address/function Interface 220A and the transfer operations performed on the Data Interface 210A. For example, if address and control information is transferred via Address/function Interface 210A for request A, then for request B, the same ordering must be maintained for the later-performed data transfer operations. The data for request B may not precede that for A.

In some instances within the preferred embodiment, it is also required that the POD Request Signal 304 be asserted sometime prior to, or at the same time as, the assertion of the associated Data Request Signal 310. This requirement is not considered a limitation because A/F Lines 302 are capable of transferring approximately three times the number of requests in a given time period as compared to Data Signal Lines 308. Therefore, for a given transfer, the A/F Lines 302 are generally available for use either before, or at the same time as, the Data Signal Lines 308 become available. The POD Request Signal 304 may be asserted after the Data Request Signal 310 in those cases in which the MSU will be performing one or more command transfers to POD 120A on A/F Lines 302 when POD 120A seeks to perform both an address transfer and an associated data transfer to the MSU. In these situations, POD 120A is allowed to perform one data transfer which precedes the associated command transfer, as will be discussed further below.

Figure 5:
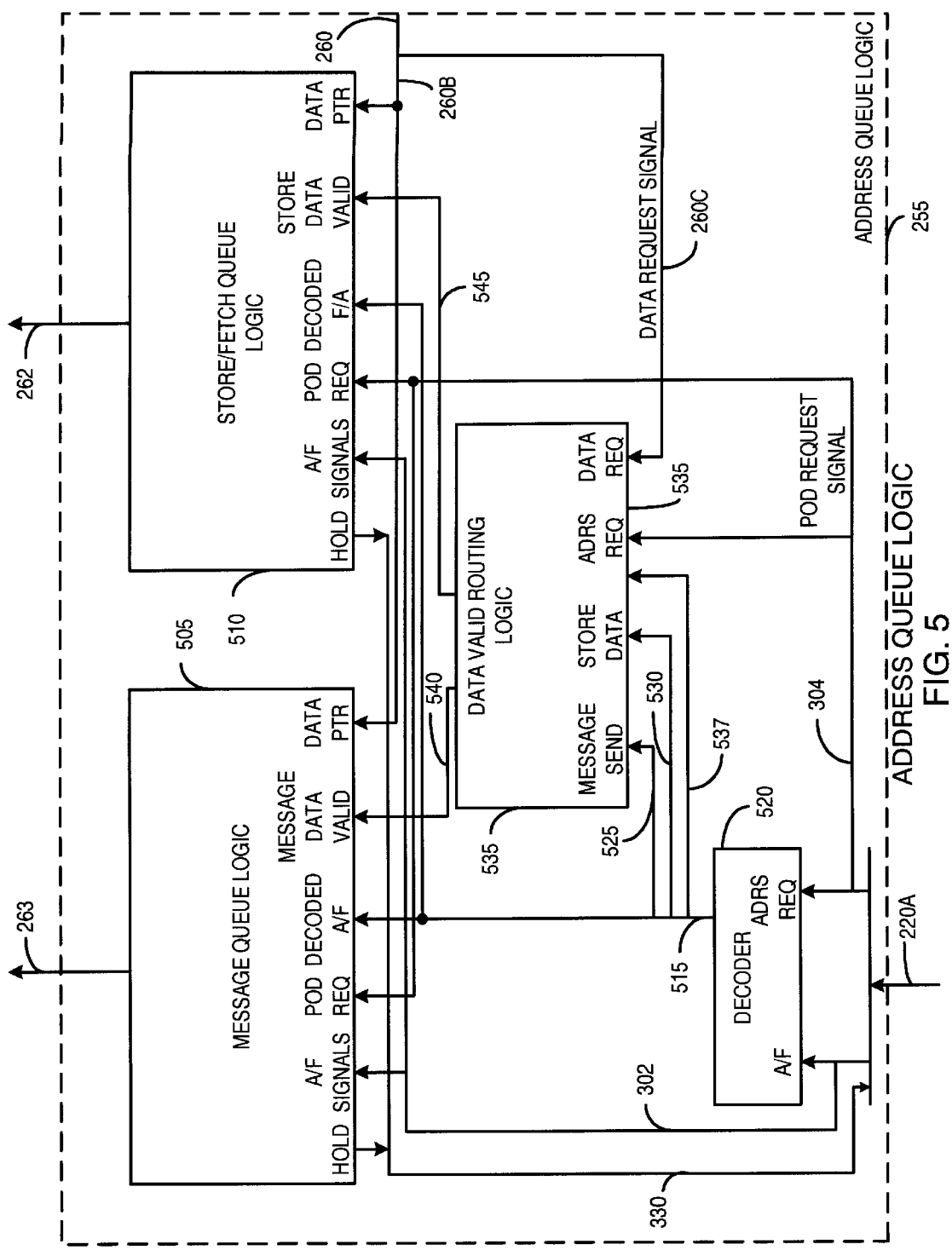
FIG. 5 is a block diagram of the Input Address Queue Logic.

FIG. 5 is a block diagram of the Address Queue Logic 255. As discussed above, this logic receives command and control information via Address/function Interface 220A from POD 120A. Because in a given period of time, the Address/function Interface 220A is capable of transferring more requests than may be handled by Data Interface 210A, it is highly probable that the Address Queue Logic 255 will receive the address and control information for a given request before, or at the same time as, the POD Data Queue 245 receives any associated request data. The discussion which immediately follows therefore assumes that address and control information for a request is provided on Address/function Interface 220A before the associated data signals are provided on the Data Interface 210A. The special-case situation in which data is received by POD Data Queue 245 prior to the associated address information being received within Address Queue Logic 255 is explained later.

The circuit of FIG. 5 includes two queues, each having associated control logic. These queues are shown as Message Queue Logic 505 and Store/Fetch Queue Logic 510. Message Queue Logic 505 queues the address and control information associated with message requests from POD 120A. Store/Fetch Queue Logic 510 queues all other requests from POD 120A that are not message requests, including requests to store and to fetch data from MSU 110A, or to return data to another POD. Both the Message Queue Logic 505 and Store/Fetch Queue Logic 510 receive A/F Lines 302 and POD Request Signal 304 (included in Address/function Interface 220A). Both the Message Queue Logic and Store/Fetch Queue Logic also receive Decoded Address/Function (A/F) Signals 515. Decoded A/F Signals 515 are generated by Decoder 520, which decodes selected ones of the A/F Lines 302 when POD Request Signal 304 is asserted. The Decoded A/F Signals 515 indicate which type of request is being made by POD 120A, and include Message Indicator 525, which indicates that POD 120A is making a message-send request, and Store Data Indicator 530, which indicates that POD 120A is making a store-data request.

Message Indicator 525 and Store Data Indicator 530 are provided to Data Valid Routing Logic 535. Data Valid Routing Logic records the fact that a request has been made that is associated with data. Since the Address/function Interface 220A and Data Interface 210A operate independently, the data signals for a given request may be provided much later than the associated address and control information which has already been stored within either the Message Queue Logic 505 or the Store/Fetch Queue Logic 510. Eventually, however, the data which is associated with the previously received message-send or store-data request will be provided by the POD 120A to the MSU 110A. When this occurs, the MSU Data Control 334 provides the POD Data Queue 245 with the Data Request Signal on the interface shown as Control Lines 260, and the POD Data Queue captures the data signals provided by the POD on Data Signal Lines 308. MSU Data Control 334 also sends Data Request Signal 310, and other control signals to be discussed below, to the Address Queue Logic 255 (FIG. 2).

Within Address Queue Logic 255, Data Request Signal 310 is forwarded on Line 260 and 260C to Data Valid Routing Logic 535. As discussed above, the Data Valid Routing Logic 535 records the presence of all message-send or a store-data requests waiting for associated data. The Data Valid Routing Logic 535 determines whether the received Data Request Signal is associated with a pending message-send request or a pending store-data request. The Data Valid Routing Logic 535 then asserts either the Message Data Valid Signal 540, or the Store Data Valid Signal 545, respectively. The Message Queue Logic 505 receives the Message Data Valid Signal 540, and matches the received signal with a particular one of the pending message requests in a manner to be discussed below. This allows the matched one of the requests to become eligible for further processing. When the request is selected for processing, Message Queue Logic provides the associated command and control information on Line 262, where it is provided to Control Logic 265 in a manner to be discussed below.

In a similar manner, the Store/Fetch Queue Logic 510 receives the Store Data Valid Signal 545, and matches the signal with a particular one of the pending store-data requests. The matched one of the pending store-data requests becomes eligible for further processing. The request will eventually be selected for processing, and the command and control information associated with the request will be selected from Store/Fetch Queue Logic 510, and provided to Control Logic 265 via Line 263 in a manner to be discussed below.

The Message Queue Logic 505 and the Store/Fetch Queue Logic 510 also receive Data Pointer Signals on Line 260B. These signals are provided by the MSU Data Control 334 as part of Control Lines 260 along with the Data Request Signal 310. When data is stored within POD Data Queue 245, Data Pointer Signals on Line 260B are generated to indicate the addressable location within POD Data Queue 245 of the stored data signals. Data Pointer Signals are used to associate the command and control signals stored within either the Message Queue Logic 505 or the Store/Fetch Queue Logic 510 with the later-received data signals for the same request, as will be described below.

Figure 6:
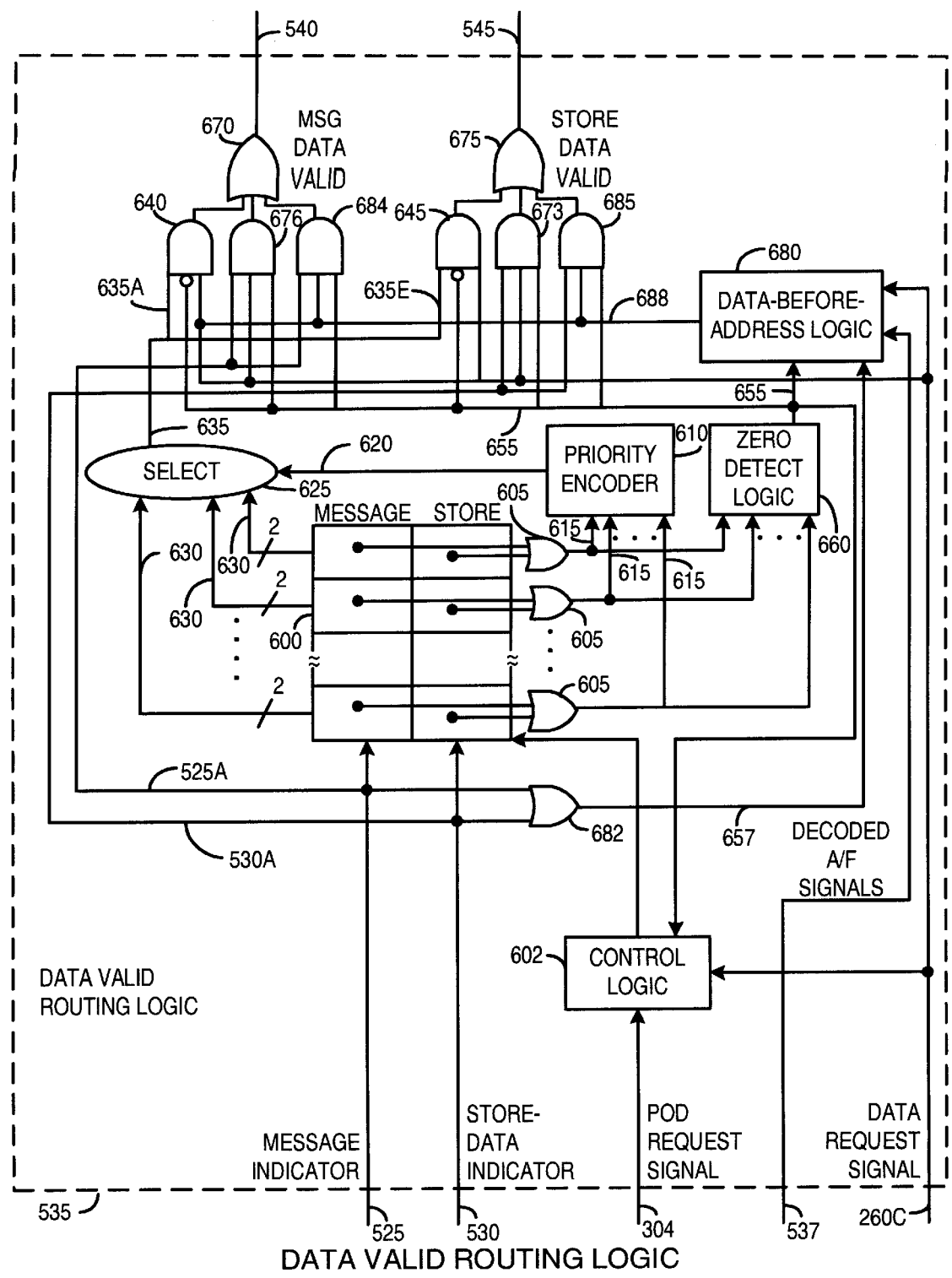
FIG. 6 is a block diagram of the Data Valid Routing Logic.

FIG. 6 is a block diagram of the Data Valid Routing Logic 535. The function of this logic is to route a data valid indication as indicated by the assertion of Data Request Signal 310 to either Message Queue Logic 505 or Store/Fetch Queue Logic 510. In the preferred embodiment, this routing occurs to logic structures which are located within the same memory unit, although one skilled in the art will appreciate that this need not be the case.

There are three logical paths through the Data Valid Routing Logic 535, depending on the relationship between address and data transfers for the associated request. In the first case, an address is received prior to the associated data signals. In the second case, an address is received simultaneously with the associated data signals. Finally, in the third case, address signals are transferred after the associated data signals.

In the first case, Message Indicator 525 or Store Data Indicator 530 is received before assertion of Data Request Signal on Line 260A. The reception of the indicator will be recorded in the first rank of the Indicator Storage Device 600. The Indicator Storage device has a predetermined number of ranks, each of which is two bits wide, and each provides an indication of either a pending message-send or store-data request. Therefore, within each rank, at most only one bit is set. The setting of a bit within Indicator Storage Device 600 is controlled by Control Logic 602, which enables Indicator Storage Device to be written when the POD Request Signal 304 is asserted. Any previously-stored indicators in other ranks within Indicator Storage Device 600 will advance one rank. Thus, the reception of the indicators is recorded in a time-ordered fashion, with the indicators representing the oldest requests being stored nearest the top of the Indicator Storage Device 600 (that is, closest to the rank shown as Rank 600A). Each rank within Indicator Storage Device 600 is associated with, at most, one request. That is, within each two-bit rank, each rank will record, at most, the assertion of Message Indicator 525, or Store Data Indicator 530. In the system of the preferred embodiment, Indicator Storage Device 600 includes 16 ranks, and is therefore capable of recording 16 requests.

As discussed above, the POD 120A is required to send any data signals via Data Interface 210A in the same order as previously-provided address and control signals were provided on Address/function Interface 220A. Therefore, it is guaranteed that the received Data Request Signal on Line 260A may be matched with the indicator which has been stored within Indicator Storage Device 600 the longest.

In this first case, a latter-received Data Request Signal on Line 260A is matched with the indicator which has been stored the longest using OR gates 605 and Priority Encoder 610. Each of the OR gates 605 receives two stored signals from a given rank within Indicator Storage Device 600, each representing the reception of the Message Indicator 525, or the Store Data Indicator 530. Each OR gate will indicate the presence of either of the associated stored signals by driving an associated one of Lines 615 to Priority Encode 610. Priority Encoder receives all of the signals on Lines 615, and generates encoded signals shown on Line 620 to Selector 625. The encoded signals on Line 620 cause Selector 625 to select from the Indicator Storage Device 600 the rank which includes the signal representing the oldest pending request. The signals stored within the oldest rank are received by Selector 625 on associated ones of Lines 630, and are gated to Line 635.

Line 635 includes the signal for representing the reception of Message Indicator 525, which is provided on Line 635A to AND gate 640. Line 635 further includes the signal for representing the reception of the Store Data Indicator 530, which is provided to AND gate 645 on Line 635B. At most, only one of the signals on Line 635A or 635B will be asserted.

Each of the AND gates 640 and 645 further receives Zero Detect Signal on Line 655. The Zero Detect Signal is asserted by Zero Detect Logic 660 only if the Indicator Storage Device 600 does not contain any valid pending requests as is detected by OR gates 605. In this first example, Indicator Storage Device 600 will contain at least one valid pending request by virtue of the fact that the address signals were provided prior to the data signals. Therefore the Zero Detect Signal on Line 655 is de-asserted at the time the Data Request Signal is received on Line 260A. This allows one of AND Gates 640 or 645 to route the oldest pending valid indicator to OR Gate 670 or 675, respectively, which in turn drives Message Data Valid Signal 540 for a message request, or Store Data Valid Signal 545 or a store data request.

In case two, the POD Request Signal 304 is provided substantially simultaneously with Data Request Signal 310 for a given request. Since the POD 120A is always required to send data signals via Data Interface 210A in the same order as POD 120A sends associated address and control information via Address Interface 220A, sending address, control, and data signals for a given request together at the same time implies that no pending requests will be stored within Indicator Storage Device 600. In these cases, by-pass paths are used. That is, Message Indicator 525 is provided to AND Gate 676 on by-pass path shown on Line 525A. Since Indicator Storage Device 600 is empty, Zero Detect Signal on Line 655 is provided to AND Gate 676. Therefore, Message Data Valid Signal 540 is asserted upon the reception of the Data Request Signal on Line 260A. Similarly, Store Data Indicator 530 is provided to AND Gate 678 on by-pass path shown on Line 530A. AND Gate 678 receives asserted Zero Detect Signal and Data Request Signal to cause Store Data Valid Signal 545 to be asserted.

As stated above, Address/function and Data Interfaces of the present invention operate almost completely independently. In some situations, however, it is required that the Data Request Signal 310 be asserted at the same time as, or later than, the associated POD Request Signal 304. This timing constraint is a design choice made to simplify control logic. However, this required timing relationship is not considered to pose a limitation, since the Address/function Interface 220A is capable of servicing significantly more address requests in a given period of time than is the Data Interface 210A. As such, the required ordering of transfers, that is, address before, or at the same time as, data, will almost invariably occur by default. These situations are governed by the first and second cases, respectively, discussed above. The Data Request Signal 310 will be asserted before the POD Request Signal 304 in those situations in which the MSU 110A is utilizing A/F Signals to transfer address and function information to POD 120A at the same time as the POD is prepared to initiate a request associated with data signals to the MSU. In another similar instance, the MSU has asserted Hold Signal 330 to the POD because its Address Queue 255 is full, but POD Data Queue 245 can still accept entries. In both of these situations, it is desirable to allow the POD to assert Data Request Signal 310 and to provide Data Signal Lines 308 to POD Data Queue 245 before the associated address is transferred on A/F Lines 302, since this will increase system throughput.

In the situations in which Data Request Signal 310 precedes POD Request Signal 302, Data Valid Routing Logic 535 operates according to the third case mentioned above. For these cases, Data-Before-Address (DBA) Logic 680, which is a logic sequencer, receives Data Request Signal 260A when no entries exist in Indicator Storage Device 600, and no message-send or store-data requests are currently available for processing. DBA Logic 680 detects this via the assertion of Zero Detect Signal on Line 655, and by the fact that OR gate 682 is not indicating the present of a currently valid Message Indicator 525 or Store-Data Indicator 530. DBA Logic holds the received data indication until the next Message Indicator 525 or Store-Data Indicator 530 is received. When this indicator is received, it is presented on by-pass path 525A or 530A to AND Gates 684 and 685, respectively. At this time, the DBA Sequences unblocks the data indication and drives Line 688 so that either Message Data Valid Signal 540 or the Store Data Valid Signal 545 is driven.

During the situations when the DBA Logic 680 is temporarily blocking the Data Request Signal, the next transfer operation that is performed by the POD must be the transfer of the address associated with the data. That is, the POD may not buffer another data transfer in POD Data Queue 245 before transferring the address associated with the blocked Data Request Signal. Moreover, the POD may not transfer a different address that is not associated with the pending data transfer. If either of these two operations occur while the DBA Logic is blocking the Data Request Signal, DBA Logic 650 detects an error. In response, DBA Logic logs the error, and appropriate fault handling is initiated. This fault handling is beyond the scope of this patent.

As discussed above, requiring the address signals to be provided before, or at the same time as, as data signals for some of the requests is a design choice made for simplification purposes. One skilled in the art will recognize that logic similar to that discussed above with respect to the Data Valid Routing Logic 535 and Store/Fetch Queue Logic 510 could be added to MCA 250 to allow multiple data requests to precede command requests associated with data. In other words, similar logic could be added to the MSU Data Control Logic 334 to make it possible for the Data Request Signal 310 to precede the associated POD Request Signal 304 in the same manner as is discussed above for the address-before-data situations. However, this would result in a design which is more logic intensive, and would not result in significantly more interface flexibility, since most situations in which it is desirable for data signals to precede address signals are provided for by the DBA Logic discussed above.

Figure 7:
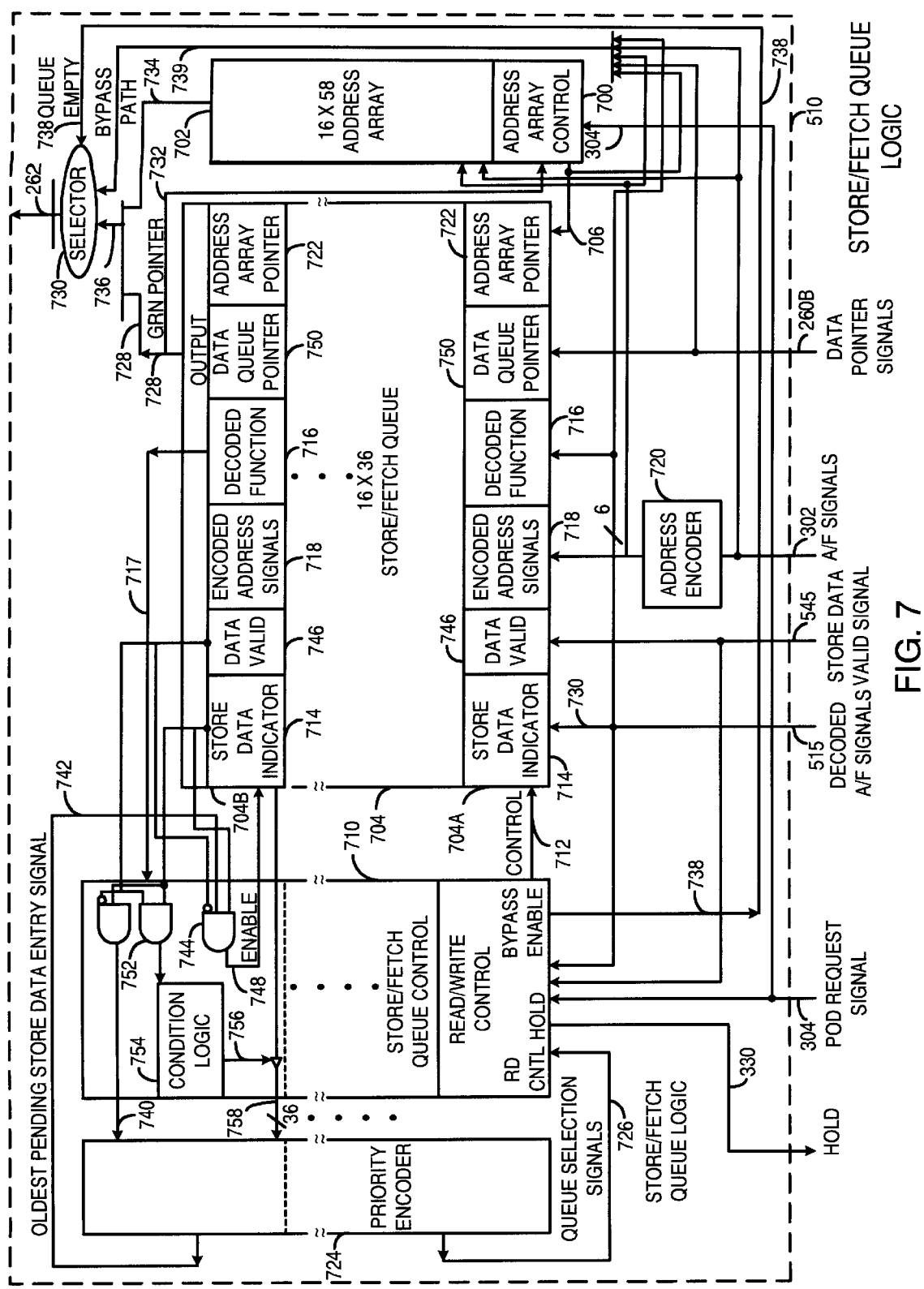
FIG. 7 is a block diagram of the Store/Fetch Queue Logic.

FIG. 7 is a block diagram of the Store/Fetch Queue Logic 510. Store/Fetch Queue Logic 510 includes logic which stores address and control information for all requests that are not message requests, including all types of store and fetch requests. One of the primary functions of the Store/Fetch Queue Logic includes storing a request, then determining when all conditions have been met for the request so that the request may be handled. For example, some requests may not be processed until associated data signals are received on the independent Data Interface 210A. The Store/Fetch Queue Logic 510 provides this functionality in a manner to be described below.

During a transfer on Address/function Interface 220A, POD 120A asserts POD Request Signal 304, and provides address and control information to Address Array Control 700 within Store/Fetch Queue Logic 510. In response, Address Array Control 700 causes the Address Array 702 to latch the 42 bits of address and control information which is provided by POD 120A on A/F Lines 302 during the two-cycle address transfer operation. The 42 bits of address and control information may be latched in any vacant location within Address Array 702. Address Array Control 700 determines the address of the vacant location within Address Array 702 which receives this address and control information, and provides this address to Store/Fetch Queue 704 as the Address Array Pointer 706. Additional information required for further processing of the POD request is also added to the Address Array at this time, the details of which are beyond the scope of this invention.

In the preferred embodiment, Address Array 702 is a 16×58 Storage Array capable of storing address and control information for 16 different requests from POD 120A. MCA 230 asserts Hold Line 330 to POD 120A when the number of queued requests approaches this capacity to indicate that no new requests may be issued by the POD until a sufficient number of requests are removed from Store/Fetch Queue Logic 510. By issuing the Hold Line prior to the Store/Fetch Queue reaching maximum capacity, the MCA takes into consideration the possibility that one or more store-data requests are in transit at the time the Hold Line is asserted. This prevents overrun situations.

In addition to being provided to the Address Array Control 700, POD Request Signal 304 is also provided to Store/Fetch Queue Control 710, causing a signal on Line 712 to be generated to Store/Fetch Queue 704. The signal on Line 712 enables Store/Fetch Queue 704 to latch additional information regarding the received request. This information includes Address Array Pointer 706, Data Pointer signals 260B, decoded A/F signals 730, Store Data Valid 545 (if applicable and available), and other relevant information.

The Store/Fetch Queue of the preferred embodiment is a 16×36 storage array. Information for a newly-received request (hereinafter, "Request Information") is latched into the first row within Store/Fetch Queue 704 shown as Row 704A, and any other stored Request Information associated with previously-received requests is advanced one row within Store/Fetch Queue. Therefore, within the Store/Fetch Queue, all Request Information is time-ordered. The Store/Fetch Queue of the preferred embodiment is capable of storing Request Information for 16 different requests.

The Request Information includes Decoded A/F Signals 515 which describe the type of store or fetch operation being performed. The Decoded A/F Signals 515 include the Store Data Indicator 530, which is latched in Field 714. The purpose of the other Decoded Function Signals 515, which are shown stored in Field 716, is beyond the scope of the present invention and is not described further. The request information further includes Encoded Address Signals in Field 718. The Encoded Address Signals 718 are generated from the A/F Signals by Address Encoder 720, and include information which identifies a memory device or one of the PODs 120 as a target of the current request. Also latched into the Store/Fetch Queue is the Address Array Pointer 706, which points to a location within Address Array 702 that stores the associated 42 bits of address and control information obtained from the Address/function Interface 220A, plus 16 bits of supplemental information from Encoded Address Signals 718. The Address Array Pointer 706 is shown stored within Field 722 of Store/Fetch Queue 704.

While Request Information for a request is latched within Store/Fetch Queue 704, it is visible to Store/Fetch Queue Control 710. The Request Information is processed by the Store/Fetch Queue Control 710 to determine if the associated request is eligible for processing. For each type of request, as indicated by the Decoded Function 716 on Line 717, a predetermined set of conditions must be met before the request is eligible for processing. These conditions are largely beyond the scope of this Application, however, one of the conditions involving those requests associated with data signals will be discussed below. Once the Store/Fetch Queue Control 710 has determined that all conditions associated with a given request are met, the Request Information for that request is provided to the Priority Encoder 724, which prioritizes and schedules the request for processing based on request type as indicated by the Decoded Function 716, the availability of the target device as indicated by the Encoded Address Signals in Field 718, and the age of the pending request. The request which is determined by Priority Encoder 724 to be of the highest priority, and which is targeted for an available device, is selected using Queue Selection Signals 726.

The assertion of Queue Selection Signals 726 causes Store/Fetch Queue Control 710 to generate read control signals on Line 712, allowing a selected one of the rows associated with the highest priority request to be read from Store/Fetch Queue 704. The selected request information is provided by Store/Fetch Queue 704 on Lines 728 to Selector 730. Ones of the signals shown on Line 728 include the Address Array Pointer, which is provided on Line 732 to Address Array Control 700, thereby causing Address Array Control to read the associated 58 bits of address, control, and supplemental information from Address Array 702 onto Line 734. All information on Line 734 is merged with the request information on Line 728 to form a Request Packet on Line 736. Since in this example, the Store/Fetch Queue was not empty, the Bypass Enable Signal 738 is not being asserted by Store/Fetch Queue Control 710, and therefore Selector 730 routes the request packet on Line 736 to the nets shown on Line 262.

If the Store/Fetch Queue is empty when Store Fetch Queue Logic receives a request, and the request is not associated with any unsatisfied conditions, as determined by Store/Fetch Queue Control 710, the Bypass Enable Signal 738 is asserted, allowing the A/F Signals on Line 302 and other Request Information to be selected on By-pass Path 739. The Bypass Enable Signal is also asserted to allow requests associated with immediately-available resources to be provided directly to the Selector 730 if no previous requests are queued which are targeted for that same available resource. This saves time in processing the request. After the request packet is selected by Selector 730, it is provided to Control Logic 365 via Line 262.

The above description involves the general operation of the Store/Fetch Queue Logic 510 as it relates to any request, including those requests such as fetches which are not associated with data. The following discussion relates to the processing by the Store/Fetch Queue Logic 510 of store-data requests. This description assumes that POD 120A is providing the address and control information before the data signals.

When a store-data request is provided to Store/Fetch Queue Logic 510, information regarding the request is latched into the Store/Fetch Queue 704 in the manner described above if the Store/Fetch Queue is not already full. The Store Data Indicator 730 is latched into Field 714 of Store/Fetch Queue, indicating that this request is associated with data. Since the request is associated with data, the Store/Fetch Queue Control 710 will determine that the associated request information may not be provided to the Priority Encoder 724 until the Store Data Valid Signal 545 for that request is provided by Data Valid Routing Logic 535. In other words, for a store-data request, one of the conditions which makes the request eligible for processing is the reception of the associated data. It will be remembered that since the Address/function Interface 220A and the Data Interface 210A operate independently, Store/Fetch Queue 704 could receive many requests between the time a particular store-data request is received and the time the associated data signals are received by MDA 230.

As stated above, the matching of address and control information to later-arriving data is performed based on the assumption that for those requests associated with data, POD 120A is required to send address and command information in the same order as the associated data signals are (subsequently) transferred. By maintaining requests in a time order within the Store/Fetch Queue 704, the Store/Fetch Queue Control 710 is able to match a received Store Data Valid Signal 545 with a pending store-data request.

Requests are maintained in the Store/Fetch Queue 704 in a time order by storing newly-arriving requests in the first row shown as Row 704A, and advancing all other stored requests one row. It will be appreciated that requests are not necessarily processed in a first-in first-out fashion since processing of requests depends on all conditions having been met for that request. For example, a fetch request may become eligible for processing before data arrives for earlier-received store request, and therefore the fetch request will be processed first. Because request processing does not necessarily occur on a first-in, first-out basis, a request which is stored between two other valid requests within the Store/Fetch Queue 704 may be removed for processing, leaving a vacant row. In this instance, a newly arriving request is stored in Row 704A, and other requests bubble forward to fill the vacancy. When the Store/Fetch Queue is nearing capacity, the Address Hold Signal 330 is asserted indicating that POD 120A is not to send further requests until appropriate queue space is again made available.

Store/Fetch Queue Control 710 includes dedicated logic associated with each row in the Store/Fetch Queue that determines whether the signals stored within the associated row are eligible for processing by Priority Encoder 724. FIG. 7 shows logic for Row 704B that is used to match a store-data request with a later-received Store Data Valid Signal 545. It will be understood that logic similar to that shown for Row 704B is associated with each row within Store/Fetch Queue 704. One skilled in the art will recognized that Store/Fetch Queue Control 710 could also include logic for each row in Store/Fetch Queue for determining whether other conditions associated with other types of requests have been met.

Store/Fetch Queue Control records the presence of valid pending store data requests within the Store/Fetch Queue 704 by generating a Valid Pending Store Data Indicator for a respective row within the Store/Fetch Queue if the Store Data Indicator is asserted for that row and the Data Valid Indicator is not asserted for that row. Valid Pending Store Data Indicator 740 is shown for row 704B, but similar Valid Pending Store Data Indicators exist for each of the rows of the Store/Fetch Queue. Valid Pending Store Data Indicator 740 is provided to Priority Encoder 724 to indicate that a valid pending store data request is stored within the associated row in the Store/Fetch Queue. Priority Encoder 724 determines which row contains the oldest valid pending store data request and provides an Oldest Pending Store Data Entry Signal 742 to the associated row logic within Store/Fetch Queue Control 710. Oldest Pending Store Data Entry Signal 742 is the signal associated with Row 704B, but similar signals exist for each row in Store/Fetch Queue 704. Oldest Pending Store Data Entry Signal 742 is received by AND Gate 744, which also receives the Store Data Indicator from Field 714, and the Data Valid Indicator from Field 746. AND gate 744 asserts a signal on Line 748 if the associated Row 704B contains the oldest pending store-data request. The oldest pending store-data request is the oldest request for which the Store Data Indicator is asserted, and for which the Data Valid Indicator has not yet been received.

When the POD 120A next provides data signals to the MDA 230, the data signals are latched within POD Data Queue 245. MSU Data Control 334 provides both the Data Request Signal and the Data Pointer Signals to Address Queue Logic 255 on Line 260. Data Valid Routing Logic 535 receives the Data Request Signal and generates Store Data Valid Signal 545, which is provided to both Store/Fetch Queue Control 710 and to Store/Fetch Queue 704. In response, Store/Fetch Queue Control 710 asserts control signals on Line 712 to enable Store/Fetch Queue to be written. Assuming the Oldest Pending Store Data Entry Signal on Line 748 for Row 704B is asserted, Row 704B is enabled to receive the Store Data Valid Signal in Field 746. Also at this time, the Data Pointer Signals on Line 260B are also stored within Field 750 of Row 704B. The Data Pointer Signals indicate the address within POD Data Queue 245 of the associated data signals. After the store operation, Row 704B contains pointer information in Fields 722 and 750 which indicates, for the associated store-data request, the location within Address Array 702 of the address and control information, and the location within POD Data Queue 245 of the associated data signals, respectively. In this manner, the circuitry associated with the enabling of a given row of Store/Fetch Queue 704 to receive and to store Data Pointer Signals serves as a correlation circuit to correlate address signals and independently transferred data signals for a given request.

After the Store Data Indicator of Field 714 and the Data Valid Indicator of Field 746 are set, AND Gate 752 provides a signal to Condition Logic 754 indicating that data is present for the associated request. As discussed above, Condition Logic 754 could also include logic for determining whether other conditions associated with the request have been met. When all conditions are met for the request, Condition Logic 754 provides a signal on Line 756 indicating the request is now eligible for processing. The signal on Line 756 enables the request information from Row 704B to be provided on Line 758 to Priority Encoder 724. Priority Encoder 724 thereafter schedules the request for processing based on request type indicated by Field 716, the availability of the requested resource as indicated by the Encoded Address Signals in Field 718, and the age of the request as indicated by the position of the row within Store/Fetch Queue 704.

When the request is selected for processing, the associated row is read from Store/Fetch Queue 704, the A/F signals and supplemental information are retrieved from Address Array 702, the signals are driven onto Line 262, and are provided to Control Logic 265 in the manner discussed above.

After receiving a store-data request from the Address Queue Logic 255, Control Logic 265 gates the Data Queue Pointer Signals from Field 750 onto Line 275. Data Queue Pointer Signals on Line 275 are provided to Data Queue Interconnect Logic 247. Crossbar Interconnect Logic uses the Data Queue Pointer Signals to read the associated data signals from the indicated address within POD Data Queue 245 or a similar queue structure. After the data signals are read from the queue, Control Logic 265 provides routing information on Line 275 to Data Queue Interconnect Logic 247 to route the associated data signals to the requested destination as indicated by the A/F Address Signals that are associated with the request. For a store-data request, the data signals are routed to the requested one of the MCLs 235A, 235B, 235C, or 235D on Lines 240A, 240B, 240C, or 240D, respectively, and the A/F signals are also provided to the requested one of the MCLs on Lines 270A, 270B, 270C, or 270D, respectively. For a message request or POD-to-POD return request, the data signals are routed to another one of the PODs via Data Interfaces 210E, 210J, or 210N.

The above description involves those cases in which address signals are provided prior to data signals for a given request. When those signals are provided substantially simultaneously by a POD to an MSU, the Bypass Path 739 may be used if Store/Fetch Queue Control 710 determines that this new store request meets the conditions to bypass the Store/Fetch Queue 704. Otherwise, the request is queued with both store data valid and data valid conditions set, and including the corresponding data queue pointer. Scheduling the request for further processing proceeds as discussed earlier.

Finally, in the case in which data signals are provided before address signals, DBA Logic 680 delays the generation of the Message Data Valid Indicator 540 or the Store Data Valid Indicator 545 in the manner discussed above. When the store data request is received, the DBA Logic 680 provides Store Data Valid Indicator to the Store/Fetch Queue Logic 510, and processing continues as described for the case in which the request and data are received simultaneously.

The above description involves the handling of store-data requests by the Store/Fetch Queue Logic 510. The Message Queue Logic 505 is similar in operation to the Store/Fetch Queue Logic 510. That is, the Message Queue Logic processes the Message Data Valid Signal 540 in a similar manner to that in which Store/Fetch Queue Logic 510 processes the Store Data Valid Signal 545. The Message Queue Logic request packet is available on FIG. 5 Line 263, and is forwarded to the Control Logic 265 via the interface on Line 263. The Message Queue Logic will therefore not be described further.

The above-described embodiment utilizes two queue structures to store address information associated with pending requests that are associated with data. One skilled in the art will readily recognize that a system utilizing N queues and an N-way steering mechanism may be implemented by expanding to N bits each rank of the Indicator Storage Device 600. Furthermore, it will be appreciated that logic similar to that described above as being located within an MSU 110 could be included within a POD 120 to correlate address signals and data signals provided by an MSU to a POD via the bi-directional address and data interfaces, respectively.

While various embodiments of the present invention have been described above, it should be understood that they have been presented by way of example only, and not as a limitation. Thus, the breadth and scope of the present invention should not be limited by any of the above-described exemplary embodiments, but should be defined only in accordance with the following claims and their equivalents.

What is claimed is:

1. For use in a data processing system having a first unit and a second unit, wherein the first unit is capable of making requests to the second unit and each of the requests includes address signals and predetermined ones of the requests including data signals, an interface system for coupling the first unit to the second unit to transfer the requests from the first unit to the second unit, comprising:

an address interface directly coupling the first unit to the second unit to perform selected address transfer operations, each of said address transfer operations to transfer address signals associated with a respective one of the requests;

a plurality of address storage devices coupled to said address interface, each one of said plurality of address storage devices arranged to store address signals in any order within said plurality of address storage devices, said address signals being associated with predetermined ones of said address transfer operations;

a data interface directly coupling the first unit to the second unit to perform selected data transfer operations independently of said address transfer operations performed by said address interface, each of said data transfer operations to transfer data signals and each of said data transfer operations being associated with a respective one of said address transfer operations; and a data routing logic circuit coupled to said data interface, coupled to said address interface, and coupled to each of said plurality of address storage devices, said data routing logic circuit to detect each occurrence of said data transfer operations and to associate said each occurrence of said data transfer operations to the one of said plurality of address storage devices coupled to store address signals for said respective one of said address transfer operations.

2. The interface system of claim 1, wherein each of said plurality of address storage devices further includes a correlation circuit to correlate the data signals for any one of said associated data transfer operations with stored ones of the address signals for said respective one of said address transfer operations.

3. The interface system of claim 2, and further including a plurality of priority logic circuits, each coupled to a different associated one of the plurality of address storage devices, each to detect when one of said data transfer operations and said respective one of said address transfer operations has been correlated by said correlation circuit, and to thereafter schedule said associated request for processing according to a predetermined priority scheme.

4. The interface system of claim 1, wherein each of said address storage devices include circuits for allowing the storage of address signals transferred during a predetermined maximum number of address transfer operations, and wherein each of said predetermined maximum number of address transfer operations may be associated with a data transfer operation which has not yet been performed.

5. The interface system of claim 1, wherein each of said address transfer operations are indicative of a request type, and wherein each of said address storage devices further includes circuits to store said predetermined different ones of the address transfer operations based on said indicated request type.

6. The interface system of claim 1, wherein said data routing logic circuit further includes data-before-address circuits to temporarily store data signals associated with a data transfer operation which is performed prior to said respective one of said address transfer operations until said respective one of said address transfer operations is performed.

7. The interface system of claim 1, wherein said address interface is bi-directional and includes address circuits to allow the second unit to transfer address signals to the first unit substantially simultaneously with said first unit performing one of said data transfer operations on said data interface.

8. The interface system of claim 1, wherein said data interface is bi-directional and includes data circuits to allow the second unit to transfer data signals to the first unit substantially simultaneously with said first unit performing one of said address transfer operations on said data interface.

9. The interface system of claim 1, and further including control circuits coupled to said address interface to allow said address interface to perform a number of said address transfer operations in a given period of time, said number of said address transfer operations being unrelated to the number of said data transfer operations performed by said data interface in said period of time.

10. In a system having a first unit and a second unit, the first unit being coupled directly to the second unit via an address interface and a data interface, the address interface for transferring address signals and associated control signals and the data interface for transferring data signals, wherein each of the data signals are associated with ones of the address signals, an interface control system to allow the address interface and the data interface to operate independently, comprising:

address storage means coupled to the second unit and to the address interface and including a plurality of address queue means, each of said address queue means for storing in any order within said address queue means, said address signals being predetermined associated ones of the address signals and associated control signals provided by the first unit to the second unit via the address interface during one or more address transfer operations;

data storage means independently operative of said address storage means, coupled to the second unit and to the data interface for storing data signals provided by the first unit to the second unit via the data interface during one or more data transfer operations, said one or more data transfer operations being performed independently to said one or more address transfer operations; and routing means coupled to said address storage means and to said data storage means for associating each of said stored data signals with an associated one of said plurality of address queue means which stores the associated ones of the address signals.

11. The interface control system of claim 10, wherein said address storage means includes correlation means for correlating said associated ones of said stored data signals to the associated ones of the address signals within said associated one of said plurality of address queue means.

12. The interface of claim 10 wherein said correlation means includes means for enabling the storing of pointers within said each of said plurality of address queue means, wherein each of said pointers is indicative of an address within said data means at which said associated ones of said stored data signals are stored.

13. The interface control system of claim 11, and further including a plurality of priority means each coupled to a different respective one of said plurality of address queue means for selecting ones of said stored address signals for processing by the second unit based on a predetermined priority algorithm.

14. The interface control system of claim 13 wherein each of said priority means includes means for blocking from selection for processing ones of said stored address signals that are associated with data signals until after said correlation means correlates the associated data signals to said ones of said stored address signals.

15. The interface control system of claim 10, wherein the control signals indicate, for the associated address signals, a selectable type of memory operation to be performed using the associated address signals, and wherein each of said address queue means stores said predetermined ones of the address signals based on said selectable type of memory operation.

16. The interface control system of claim 10, and further including data interface control means coupled to said data storage means for allowing said ones of said stored data signals to be stored by said data storage means an indeterminate amount of time prior to the time one of said address queue means receives the associated ones of said address signals.

17. The interface control system of claim 10 and further including address interface control means coupled to said address storage means for allowing any of said address queue means to store address signals which are associated with data signals an indeterminate amount of time prior to the time the associated ones of the data signals are received by said data storage means.

18. The interface control system of claim 16 wherein the address interface is bi-directional, and wherein said data interface control means includes means to allow said data storage means to receive data signals from said first unit via said data interface simultaneously with the second unit providing address signals to the first unit via the address interface.

19. The interface control system of claim 17 wherein the data interface is bi-directional, and wherein said address interface control means includes means to allow said address storage means to receive address signals from said first unit via said address interface simultaneously with the second unit providing data signals to the first unit via the address interface.

20. The interface control system of claim 10 wherein each of said plurality of address queue means includes means for receiving address signals during a predetermined maximum number of address transfer operations prior to ones of said received address signals being associated with ones of said stored data signals.

21. In a data processing system in which a first unit is coupled to a second unit via a high-speed direct interface, wherein the interface includes both an address interconnection for transferred address signals and a data interconnection for transferring data signals, and wherein the second unit includes a plurality of first storage devices for storing the transferred address signals and a second storage device for storing the transferred data signals, a method of maximizing bandpass on the interface, comprising the steps of:

(a) performing one or more address transfer operations via the address interconnection, wherein each of said address transfer operations transfers address signals from the first unit to the second unit;

(b) associating each of said address transfer operations with an associated one of the plurality of first storage devices;

(c) storing the address signals for each of said address transfer operations in said associated one of the plurality of first storage devices in any order within said associated one of the plurality of first storage devices, said address signals being;

(d) performing one or more data transfer operations via said data interface, wherein each of said data transfer operations transfers data signals from the first unit to the second unit, and wherein each of said data transfer operations is performed independently of, and asynchronously to, any of said address transfer operations, and wherein each of said data transfer operation is associated with a associated one of said address transfer operations; and (e) associating each of said one or more data transfer operations with a one of said plurality of first storage devices which is associated with said associated one of said address transfer operation.

22. The method of claim 21, and further including the step of (f) correlating each of said one or more data transfer operations with said associated one of said one or more address transfer operations.

23. The method of claim 21, wherein the second unit further includes a data-before- address circuit, and step (d) further includes the steps of (d1) determining if each of said one or more data transfer operations is performed prior to said associated one of said one or more address transfer operations; and (d2) temporarily storing data signals transferred during a data transfer operation performed prior to said associated one of said one or more address transfer operation until said associated one of said one or more address transfer operations is performed.

24. The method of claim 21, and further including the step of storing in the second storage device data signals transferred during said one or more data transfer operations.

25. The method of claim 24, wherein said step of storing data signals further includes the step of generating for each of said one or more data transfer operations respective pointer signals indicative of an address in the second storage device at which data signals for said each of said one or more data transfer operations are stored.

26. The method of claim 25, wherein step (f) includes the step of storing said respective pointer signals for any of said one or more data transfer operations in said associated one of said first storage devices along with the address signals for said associated one of said one or more address transfer operations.

27. The method of claim 22, and further including the step of selecting for processing by the second unit the address signals associated with one of said one or more address transfer operations based on a predetermined priority algorithm, and wherein said predetermined priority algorithm blocks for processing all address transfer operations which is associated with a data transfer operation that has not yet been performed.

28. The method of claim 27, wherein the second unit includes a plurality of resources, wherein each of said one or more address transfer operations is requesting access to one of said resources, and wherein said predetermined priority algorithm selects for processing one of said one or more address transfer operations based on availability of requested ones of said resources.

29. For use in a data processing system having a set of first units and a set of second units, wherein each first unit is capable of making requests to each second unit and each of the requests includes address signals and predetermined ones of the requests including data signals, an interface system for coupling one of said set of first units to one of said second units to transfer the requests from said one of said first units to said one of said second units, comprising:

an address interface coupling said one of said first units to said one of said second units to perform selected address transfer operations, each of said address transfer operations to transfer address signals associated with a respective one of the requests;

a plurality of address storage devices coupled to said address interface, each one of said plurality of address storage devices arranged to store address signals in any order within said plurality of address storage devices, said address signals being associated with predetermined ones of said address transfer operations;

a data interface coupling said one of said first units to said one of said second units to perform selected data transfer operations independently of said address transfer operations performed by said address interface, each of said data transfer operations to transfer data signals and each of said data transfer operations being associated with a respective one of said address transfer operations; and a data routing logic circuit coupled to said data interface, coupled to said address interface, and coupled to each of said plurality of address storage devices, said data routing logic circuit to detect each occurrence of said data transfer operations and to associate said each occurrence of said data transfer operations to the one of said plurality of address storage devices coupled to store address signals for said respective one of said address transfer operations.

30. A data processing system having a set of first units and a set of second units, wherein each first unit is capable of making requests to each second unit and each of the requests includes address signals and predetermined ones of the requests including data signals, and wherein said requests are routed through an interface system comprising:

an address interface coupling one of said first units to one of said second units to perform selected address transfer operations, each of said address transfer operations to transfer address signals associated with a respective one of the requests;

a plurality of address storage devices coupled to said address interface, each one of said plurality of address storage devices arranged to store address signals in any order within said plurality of address storage devices, said address signals being associated with predetermined ones of said address transfer operations;

a set of data interfaces coupling each one of said first units to each one of said second units to perform selected data transfer operations independently of said address transfer operations performed by said address interface, each of said data transfer operations to transfer data signals and each of said data transfer operations being associated with a respective one of said address transfer operations; and data routing logic circuits coupled to each said data interface, coupled to each said address interface, and coupled to each of said plurality of address storage devices, said data routing logic circuit to detect each occurrence of said data transfer operations and to associate said each occurrence of said data transfer operations to the one of said plurality of address storage devices coupled to store address signals for said respective one of said address transfer operations.

* * * * *